Aug. 15, 1939. A. J. BUSH 2,169,719
METHOD OF SELECTING ARTIFICIAL TEETH
Filed April 17, 1936
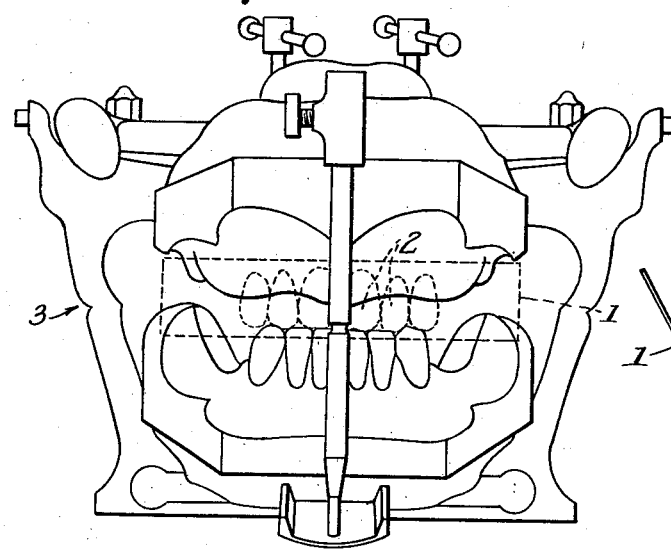
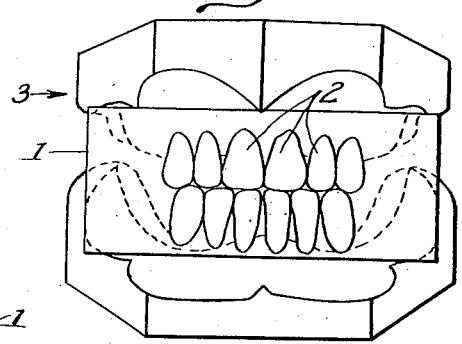
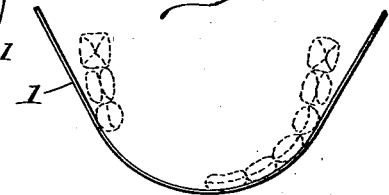
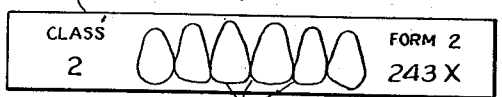
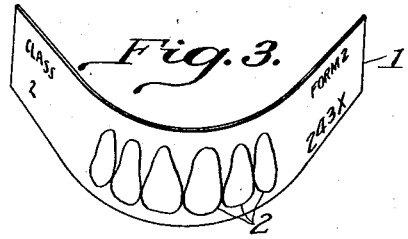
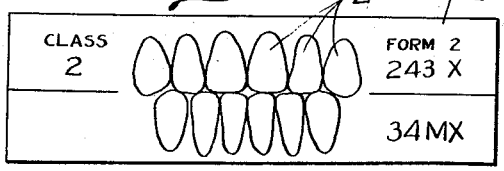
Inventor
Alden J. Bush Patented Aug. 15, 1939

2,169,719

UNITED STATES PATENT OFFICE 2,169,719

METHOD OF SELECTING ARTIFICIAL TEETH

Alden J. Bush, Columbus, Ohio

Application April 17, 1936, Serial No. 74,995

3 Claims. (Cl. 32—71)

This invention relates broadly to dentistry and has particular reference to an improved method and means whereby a dentist, or dental technician, will be enabled to readily and accurately select artificial teeth which will best conform with the requirements demanded of such teeth when employed as substitutes in the replacement of natural teeth missing from the human dental arch.

In the practice of dentistry, it is recognized that the anatomical conformation of artificial teeth and the dimensional proportions thereof should closely simulate the typal and dimensional proportions of the natural teeth they are employed to replace. Since the cost of carrying a complete line of artificial teeth of any one manufacturer from which first-hand selections could be made would be excessive, the alternative generally followed as good practice resides in the method of carefully measuring prints or cuts of teeth appearing on the pages of catalogs on the subject and published by the makers thereof to determine their adaptability to an edentulous region, said prints or cuts being well-prepared illustrations showing full size representations of each tooth in sufficient detail to permit of accurate measurement. In such illustrations, the teeth are customarily represented in harmonious sets known to the trade as sixes, twelves, fourteens and twenty-eights.

This generally used method has limitations and often leads to complications due to inherent difficulties in obtaining the exacting measurements required and since, when broadly considered, the same does not furnish the essence of the present invention, further discussion thereof is not deemed necessary. However, for a further understanding of the principles and the practical value of illustrating artificial teeth in full size representations as an accepted aid to dentists in selecting teeth, reference may be had to old and recent publications relative to the subject and generally issued by dental supply companies and manufacturers of artificial teeth.

Realizing the possibilities of error inherent in the catalog system of mensuration and the care and time consumed in following the same, the present invention provides an improved method and means whereby all forms and sizes of artificial teeth can be accurately and readily selected with reduced possibilities of error and in a more facile manner. The invention thus resides, essentially, in the provision of a series of outline or other suitable portrayals representing reproductions of teeth and charted upon pliable transparent material, said tooth portrayals being in actual size and otherwise similar in all essential details to the illustrations employed by the manufacturers of artificial teeth and supplied to the trade for reference as a useful basis of tooth selection.

In accordance with the present invention, the said charter reproductions of tooth portrayals are adapted to be held in close proximity to and in registration with the edentulous portion or portions of the dental arch to enable the operator to project the image or images of a tooth or teeth represented on the transparent material in connection with and as related to the edentulous portion or portions of said dental arch through the transparent material forming the chart, whereby as a definite means of selection, the image or images will serve substantially the same purpose as would the actual tooth or teeth or pictorial representations thereof.

Since the representations of teeth as cataloged and supplied to the dentist by the manufacturers of teeth are illustrated on opaque material, such as the paper sheets of booklets or catalogs, and the chief value of said illustrations as a matter of means for arriving at conclusions in making selections can be accomplished only through the art of mensuration, therefore, another object of this invention resides in charting said reproductions of teeth on pliable or flexible transparent material, in order to enable the operator to project or dispose the image or images of said charted teeth intimately with, in proper relation to and in full view of the dimensions of the edentulous spaces through the transparent material from which the chart is made.

Further objects of the invention reside in the provision of a device for facilitating the selection of artificial teeth composed of a sheet or strip of substantially transparent material forming outline representations of a harmonious group of teeth in their naturally occurring order and actual proportions, the sheet or strip being flexible to admit of its conformation to the curvature of the dental arch, thereby adapting the strip to the shape of the arch and juxta-posing the teeth represented thereon with edentulous portions of the arch.

For a further understanding of the invention, reference is to be had to the following description and the accompanying drawing, wherein:

Fig. 1 is a front elevation of a dental articulator, disclosing in dotted lines the application of a tooth chart formed in accordance with the present invention thereto;

Fig. 2 is a front elevation of the tooth chart;

Fig. 3 is a perspective view disclosing the chart in its flexed condition;

Fig. 4 is a front elevation of a slightly modified form of chart;

Fig. 5 is a front elevation of an articulator disclosing the chart set forth in Fig. 4 in association therewith, the chart being shown in full lines;

Fig. 6 is a plan view of a flexed chart arranged adjacent an arch having an edentulous portion, the teeth forming the arch being indicated in dotted lines.

The guide chart 1 comprising the present invention consists of a strip or sheet of a thin, flexible, substantially transparent material such as Celluloid or the like, upon which is suitably applied, by means of photography, printing from prepared plates or hand drawn outline delineations or other means known to the art, of preferably a harmonious group of teeth in their naturally occurring order and actual proportions, as indicated at 2 in Fig. 2.

In Fig. 4, a slight modification of the invention is set forth wherein the chart is provided with both upper and lower rows of outlines representing anterior teeth in the upper and lower jaws of the mouth. In addition, each chart is provided with indicia designating the general class of the teeth, the sub-class or specific modification and mold numbers, such indicia being in accordance with that employed by the manufacturers of artificial teeth in identifying the various types of teeth which they manufacture.

In Fig. 2, the chart portrays six teeth including the upper centrals, laterals and bicuspids, while in Fig. 4, the lower complemental teeth have been disclosed in outline. Obviously, the chart may be formed to include outline representations of additional teeth if the same should be desired, or a lesser number.

In the use of the chart, the latter is placed around a dental arch supported, as shown in Figs. 1 and 5, in an articulator 3, so that the tooth outlines on the chart may be registered with the edentulous space or spaces present in the arch. Since the chart is formed from a flexible transparent material, the sight of the operator will readily penetrate the same so that the adaptability of the tooth outlines portrayed on the chart to the region of application and to other teeth present in the arch will be susceptible of convenient and accurate ascertainment.

It will be understood, of course, that the dentist or dental technician will be supplied with a number of the charts containing all of the artificial teeth sold by a given manufacturer or otherwise supplied or equipped, so that the operator will have a full choice in the matter of selecting and adapting said charts to the operation at hand. The chart may be applied, if desired, directly to the mouth of the patient or to the articulator frame as disclosed, and by virtue of its construction, the charts enable the operator to proceed quickly and without laborious effort in the matter of determining typal and physical measurements of the artificial teeth which will be best adapted for any particular restoration in the field of prosthetic dentistry. When a given chart is found to portray teeth having the desired characteristics, the operator by noting the indicia thereon may readily order the artificial teeth corresponding to those portrayed on the chart.

Through the facilities thus provided, the slow and uncertain task of measuring artificial teeth in millimeters from illustrations appearing in dental manufacturers' catalogs is entirely dispensed with, time and effort saved on the part of the dentist and improved facilities provided for enabling the dentist to know beforehand and without further effort on his part that the teeth ordered or selected will be entirely suitable for the denture service required.

What is claimed is:

1. The method of selecting artificial teeth for use in prosthetic dentistry, which comprises utilizing a flexible transparency having delineated thereon actual size outlines of one or more rows of related teeth, and placing said transparency immediately adjacent to a dental arch having an edentulous region so that the outlines of the teeth on the transparency register with said region, and then visually determining the physical adaptability of artificial teeth having the characteristics of said outlines to the edentulous region and adjacent teeth.

2. The method of selecting teeth for use in denture service which comprises placing a flexible transparency having designated thereon, in actual size, tooth outlines in registration with an edentulous portion of a dental arch, and visually comparing the size and shape of the tooth outlines appearing on said transparency with the proportions of the edentulous region and adjacent to determine the suitability of artificial teeth having the measurements of said outlines for use in said edentulous region.

3. The method of selecting artificial teeth for use in prosthetic dentistry which comprises utilizing a flexible substantially transparent strip having delineated thereon actual size outlines of one or more rows of related teeth, placing said strip immediately adjacent to a dental arch and bending the strip to conform to the plan curvature of the arch, and registering the tooth outlines appearing on said strip with an edentulous portion or portions of the arch to visually determine the adaptability of artificial teeth having proportions of said outlines to said edentulous portion or portions of the arch.

ALDEN J. BUSH.